United States Patent [19]

Dragoset, Jr.

[11] Patent Number: 4,992,992
[45] Date of Patent: Feb. 12, 1991

[54] PROCESSING FOR SEISMIC DATA FROM SLANTED CABLE

[75] Inventor: William H. Dragoset, Jr., Houston, Tex.

[73] Assignee: Western Atlas International, Inc., Houston, Tex.

[21] Appl. No.: 260,793

[22] Filed: Oct. 21, 1988

[51] Int. Cl.⁵ .......................... G01V 1/36; G01V 1/38
[52] U.S. Cl. ............................................ 367/21; 367/24; 181/110
[58] Field of Search ................... 367/21, 24, 61, 53, 367/15; 181/110, 112

[56] References Cited

U.S. PATENT DOCUMENTS 4,254,480 3/1981 French ................................. 367/61
4,319,347 3/1982 Savit ..................................... 367/52
4,353,121 10/1982 Ray et al. ............................. 367/21
4,644,508 2/1987 Zachariadis ......................... 367/24

Primary Examiner—Ian J. Lobo
Attorney, Agent, or Firm—E. Eugene Thigpen

[57] ABSTRACT

Marine seismic data is gathered using a cable towed behind a cable having a slanted orientation in the water. The recorded data is processed to remove the time offset in the recorded data of seismic signals arriving at the cable at varying plane wave angles. In a preferred embodiment of the invention, the recorded data is then processed to align the primary signals, thereby misaligning the ghost signals. The data is also processed to align the ghost signals, thereby misaligning the primary signals. The two resulting data sets may then be summed.

18 Claims, 3 Drawing Sheets

PROCESSING FOR SEISMIC DATA FROM SLANTED CABLE

BACKGROUND OF THE INVENTION

1. Field of the Invention

The invention is related to the field of marine seismic exploration.

2. Description of the Prior Art

The use of a slanted cable for gathering marine seismic data has been proposed by Ray et al in U.S. Pat. No. 4,353,121, which issued on Oct. 5, 1982. A primary advantage of using a slanted cable is that it permits reduction, in seismic data, of noise resulting from ghost reflections. In marine data gathering operations, a signal from a seismic source progresses downwardly through the water until it reaches a reflecting interface. The reflected signal then travels upwardly to the seismic detectors positioned along the cable and to the water surface. The signal is then reflected downwardly by the water-air interface and is detected again by the seismic detectors. This reflection is referred to as the ghost reflection. The detection of the ghost reflection along with the primary reflection results in a distorted waveform compared to the waveform of the source impulse. The interrelated effect of the ghost reflection with the primary reflection results in interference cancellation at some frequencies and augmentation at other frequencies.

In the Ray et al disclosure, the cable was deployed at a slope of about two degrees. The primary reflection from each seismic interface and its corresponding ghost reflection is received by each detector and recorded on a field recorder. For each reflecting interface, because of the slope of the cable, the time gap between the detection of the primary and ghost reflections becomes greater, the further the detector is from the source. After typical data processing operations are performed, such as demultiplexing, gain recovery and sorting into common depth point files, static time shifts are applied to correct the primary arrivals to a datum, usually the surface of the water. Then for each interface, the velocity for the primary reflections is determined, the NMO (normal moveout) correction is applied and the primary reflections are time aligned and stacked in the time domain, thereby producing an enhanced primary stack while not emphasizing the individual ghost signals since they are not time aligned.

The data is then processed so that static corrections are also applied to correct the ghost arrivals to datum and the phase of such arrivals is reversed. In a manner similar to stacking of the primary arrivals, the ghost reflections are time aligned and stacked in the time domain, thereby producing an augmented ghost stack while not enhancing the primary stack since they are not time aligned. The two stacks are then summed.

The static time shift method of Ray et al, corrects for time offset of signals traveling vertically. However, this method does not properly correct the time offset of reflections having varying angular orientations in the water. Seismic reflections may reach the seismic cable at varying angular orientations depending on the position of the detector on the seismic cable, the depth of the reflecting interface and the angular dip of the reflecting interface.

It is an object of this invention to provide a method of time shifting all events of data recorded with a slanted cable to make them appear as if recorded by a flat cable.

SUMMARY OF THE INVENTION

Marine seismic data is gathered using a cable towed behind a vessel having a slanted orientation in the water. The recorded data is processed to remove the time offset in the recorded data of seismic signals arriving at the cable at varying plane wave angles. In a preferred embodiment of the invention, the data is then processed to align the primary signals, thereby misaligning the ghost signals. The data may also be processed to align the ghost signals, thereby misaligning the primary signals. The two resulting data sets may then be summed.

It is an object of the invention to remove the time shift in recorded data resulting from seismic signals reaching a slanting seismic cable at varying plane wave angles.

DESCRIPTION OF THE PREFERRED EMBODIMENT OF THE INVENTION

Figure 1:
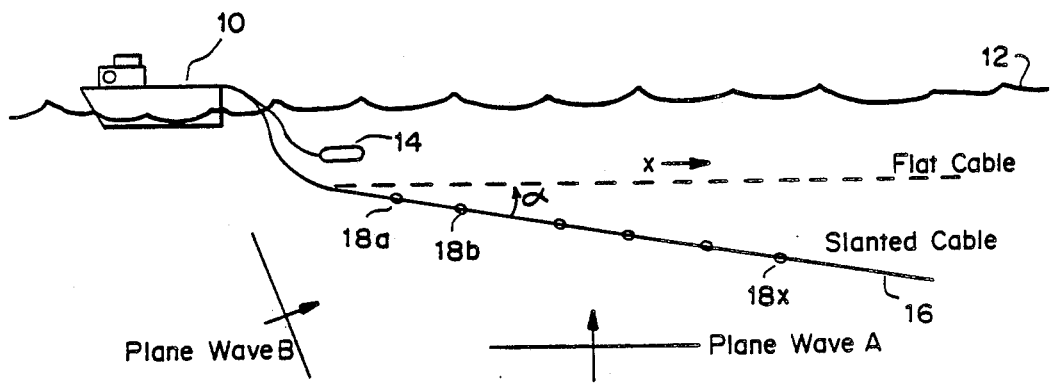
FIG. 1 shows the gathering of marine seismic data in accordance with this invention.

FIG. 1 shows a marine seismic vessel 10 moving on surface 12 of a body of water. An energy source 14 is towed by vessel 10 for imparting seismic signals downwardly into the water. The source most frequently used in marine seismic exploration at the present time is the air gun, although other sources are also utilized. Also shown towed by the vessel is a cable or streamer 16 along which are located a plurality of detectors, normally hydrophone arrays, 18a, 18b, ..., 18x. The cable slopes downwardly from its front end to its back end by an angle, $\alpha$, with respect to the horizontal which may typically be between 2 and 4 degrees.

Also shown in FIG. 1 are two plane waves A and B. Plane wave A represents a seismic signal approaching the cable from a direction directly beneath the cable. Plane wave B represents a seismic signal approaching the cable at a different angle. The signals detected by the hydrophone array will be approaching the cable from varying angles depending on the distance from the source to the detector, the depth of the reflecting interface and the dip angle of the reflecting interface.

Figure 2:
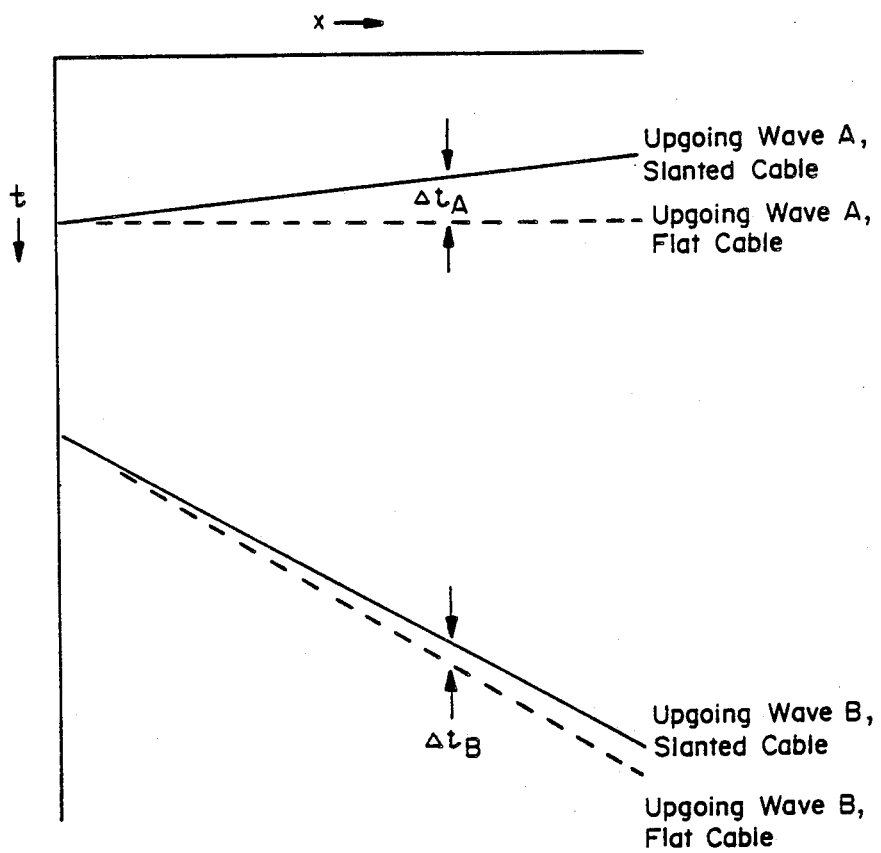
FIG. 2 shows differences in time offset, for a flat cable and a slanting cable, of signals reaching the cable at different wave front orientations.

The amount of time offset between the time a seismic signal is detected by the slanted cable and the time the signal would have been detected by a flat cable is a function of the angle at which the signal is approaching the cable and the difference in depth of the slanted cables vs. a flat cable. FIG. 2 illustrates the variation in this offset for the primary signal, where $\Delta t_A$ shows the difference in the offset for a flat cable vs. a slanted cable for plane wave A and $\Delta t_B$ represents the difference in the offset for a flat cable vs. a slanted cable for plane wave B.

In practicing the present invention, seismic data is acquired and recorded in the same manner as if the cable were substantially flat. Standard preprocessing steps are performed such as demultiplexing and trace gain treatment. Data is formatted into shot gathers and each data gather is transformed from the time offset domain to the frequency horizontal wavenumber domain by performing a two dimensional Fourier Transform. In common mathematical symbols this transformation is written as:

$$d(x,t) \rightarrow D(k_x, \omega)$$

Upward traveling events in the transformed data set are made to appear as if recorded by a flat cable by a mapping of the horizontal wavenumber $k_x$ to a new horizontal wavenumber $k_x'$. The mapping function is:

$$k_x' = k_x - \alpha[(\omega/v)^2 - k_x^2]^{\frac{1}{2}}$$

where:
v = speed of sound in the water
$\omega$ = angular frequency
$\alpha$ = angle of cable slant with reference to the horizontal.
This resulting data set will be referred to as Data Set A.

Similarly, the downwardly traveling events or ghost signals are made to appear as if recorded by a flat cable by the mapping function:

$$k_x' = k_x + \alpha[(\omega/v)^2 - k_x^2]^{\frac{1}{2}}$$

The preceding data set, which may be referred to as Data Set B, is then processed further so as to make the downward traveling (ghost) events align with the upgoing events in Data Set A. The processing is performed by multiplying the function by the factor $$(1/R)\exp(i4\pi k_z Z)$$

where:
Z = the flat cable depth to which the data is being transformed
R = reflection coefficient of the water surface
$k_z = [(\omega/v)^2 - k_x'^2]^{\frac{1}{2}}$ This resulting data set will be referred to as Data Set C.

Data Sets A and C may then be summed, and the summed data transformed back to time-offset data by performing an inverse two dimensional Fourier Transform, normally represented as $$D(k_x, \omega) \rightarrow d(x,t)$$

Normal data processing, such as normal moveout correction and stacking, is then performed.

Alternatively, Data Sets A and C may be individually inverse transformed back to time-offset data. Typically, the two data sets would then be analyzed for velocity, corrected for normal moveout (NMO) and stacked. The two stacked data sets may then be summed. As another alternative, after Data Sets A and B are transformed back to time-offset data, the Data Sets may be summed and then stacked.

The method of the invention described herein will normally be performed utilizing a digital computer of a type typically used in the industry. The writing of computer programs to perform the method is within the ability of one of ordinary skill in the art.

Figure 3:
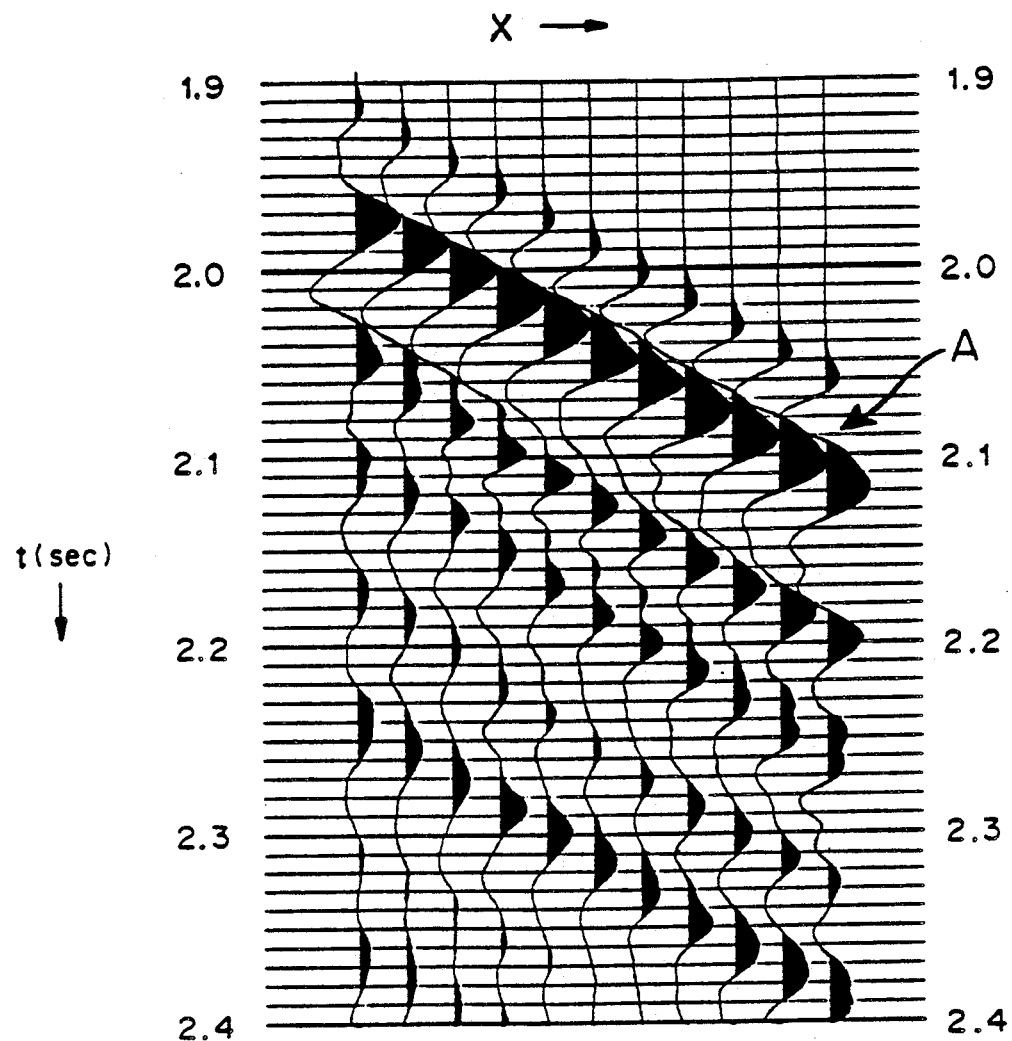
FIG. 3 shows a section of seismic data processed by the static method of the prior art.
Figure 4:
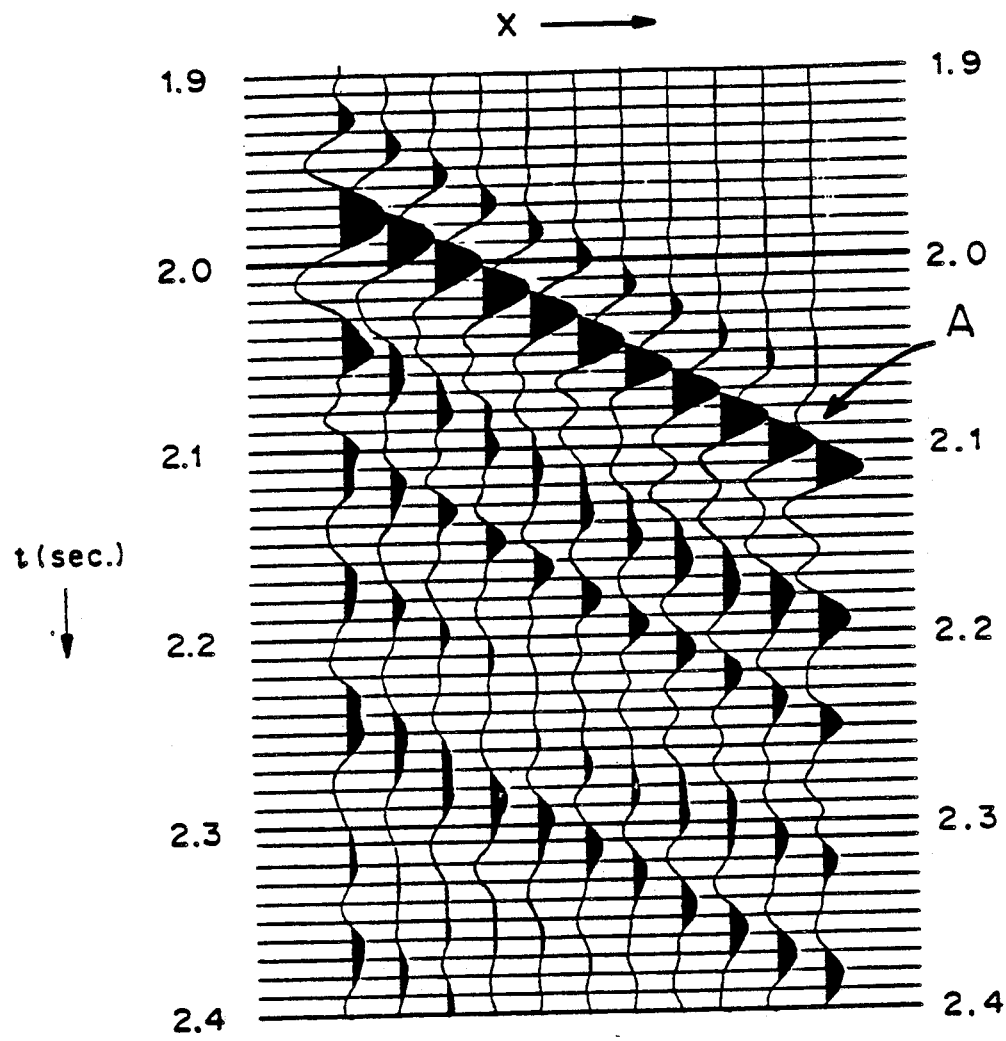
FIG. 4 shows a section of seismic data processed by the method of the invention.

FIG. 3 shows a section of data processed utilizing the static time shift method of the prior art. FIG. 4 shows the same data processed utilizing the present invention. The figures show, in the region designated as "A", the direct arrival of the seismic signal. The direct arrival is included in addition to other refracted or reflected signals because the direct arrival is an essentially horizontally traveling signal and the difference between the prior art processing and the processing of the current invention is more clearly visible. It can be observed from FIGS. 3 and 4 that there is relatively little difference in the near-offset traces, where the depth of the slanted cable is little different from the depth of a flat cable. For far-offset traces, however, where the water depth of the slanted cable increases, the difference in the data is more evident, with the data processed using the present invention displaying a greater bandwidth than the data processed by the prior art static method.

While the invention has been described with reference to a preferred embodiment, modifications and variations of the invention may be employed without departing from the scope of the invention. The scope of the invention is defined in the following claims.

I claim:

1. A method of marine seismic exploration comprising:
   recording seismic data utilizing detectors positioned on a cable towed behind a vessel at substantially a determinable angle;
   processing said seismic data to substantially remove the time offset in the recorded data resulting from the cable slant for seismic signals arriving at said slanted cable at varying plane wave angles, wherein said processing comprises:
   transforming shot gather data from time-offset domain data to horizontal wavenumber-frequency domain data;
   mapping horizontal wave numbers of events in the transformed data to new horizontal wavenumbers so that events appear as if recorded by a horizontal cable thereby generating remapped data; and
   transforming said remapped data back to the time-offset domain.

2. A method of marine seismic exploration comprising:
   recording seismic data utilizing detectors positioned on a cable towed behind a vessel at substantially a determinable angle;
   processing said seismic data to substantially remove the time offset in the recorded data resulting from the cable slant for seismic signals arriving at said slanted cable at varying plane wave angles, wherein said processing comprises:
   transforming shot gather data from time-offset domain to horizontal wavenumber-frequency domain data;
   mapping horizontal wavenumbers of events in the transformed data to new horizontal wavenumbers so that the upwardly traveling events appear as if recorded by a horizontal cable, thereby generating Data Set A;
   mapping horizontal wavenumbers of events in the transformed data to new horizontal wavenumbers so that the downwardly traveling events appear as if recorded by a horizontal cable, thereby generating Data Set B;
   processing Data Set B so as to make the downwardly traveling events align with upgoing events in Data Set A, thereby generating Data Set C;
   summing Data Sets A and C;

inverse transforming the summation of data sets A and C from the horizontal wavenumber-frequency domain to the time-offset domain.

3. A method of marine seismic exploration comprising:
  recording seismic data utilizing detectors positioned on a cable towed behind a vessel at substantially a determinable angle;
  processing said seismic data to substantially remove the time offset in the recorded data resulting from the cable slant for seismic signals arriving at said slanted cable at varying plane wave angles, wherein said processing comprises:
  transforming shot gather data from time-offset domain to horizontal wavenumber-frequency domain data.
  mapping horizontal wavenumbers of events in the transformed data to new horizontal wavenumbers so that upwardly traveling events appear as if recorded by a horizontal cable, thereby generating Data Set A;
  mapping horizontal wavenumbers of events in the transformed data to new horizontal wavenumbers so that downwardly traveling events appear as if recorded by a horizontal cable, thereby generating Data Set B;
  processing Data Set B so as to make the downwardly traveling events align with upgoing events in Data Set A, thereby generating Data Set C;
  inverse transforming Data Sets A and C separately from the horizontal wavenumber-frequency domain to the time-offset domain; and
  summing Data Sets A and C.

4. The method of claim 2 wherein said upwardly traveling events are made to appear as if recorded by a horizontal cable by mapping horizontal wavenumbers to new horizontal wavenumbers utilizing the relation:

$$k_x' = k_x - \alpha[(\omega/v)^2 - k_x^2]^{\frac{1}{2}}$$

where:
  $k_x'$ = new horizontal wave number
  $k_x$ = horizontal wave number
  v = speed of sound in the water
  $\alpha$ = angle of cable slant with reference to the horizontal
  $\omega$ = angular frequency.

5. The method of claim 3 wherein said upwardly traveling events are made to appear as if recorded by a horizontal cable by mapping horizontal wavenumbers to new horizontal wavenumbers utilizing the relation:

$$k_x' = k_x - \alpha[(\omega/v)^2 - k_x^2]^{\frac{1}{2}}$$

where:
  $k_x'$ = new horizontal wave number
  $k_x$ = horizontal wave number
  v = speed of sound in the water
  $\alpha$ = angle of cable slant with reference to the horizontal
  $\omega$ = angular frequency.

6. The method of claim 2 wherein said downwardly traveling events are made to appear as if recorded by a horizontal cable by mapping horizontal wavenumbers to new horizontal wavenumbers utilizing the relation $$k_x' = k_x + \alpha[(\omega/v)^2 - k_x^2]^{\frac{1}{2}}$$

where:
  $k_x'$ = new horizontal wavenumber
  $k_x$ = horizontal wavenumber
  v = speed of sound in water
  $\alpha$ = angle of cable slant with reference to to the horizontal
  $\omega$ = angular frequency.

7. The method of claim 3 wherein said downwardly traveling events are made to appear as if recorded by a horizontal cable by mapping horizontal wavenumbers to new horizontal wavenumbers utilizing the relation $$k_x' = k_x + \alpha[(\omega/v)^2 - k_x^2]^{\frac{1}{2}}$$

where:
  $k_x'$ = new horizontal wavenumber
  $k_x$ = horizontal wavenumber
  v = speed of sound in water
  $\alpha$ = angle of cable slant with reference to to the horizontal
  $\omega$ = angular frequency.

8. The method of claim 2 wherein said Data Set B is processed so as to make the downwardly traveling events align with upgoing events by multiplying by the factor:

$$(1/R)\exp(i4\pi k_z Z)$$

where:
  Z = the flat cable depth to which the data the data is being transformed
  R = reflection coefficient of the water surface
  $k_z = [(\omega/v)^2 - k_x'^2]^{\frac{1}{2}}$.

9. The method of claim 3 wherein said Data Set B is processed so as to make the downwardly traveling events align with upgoing events by multiplying by the factor:

$$(1/R)\exp(i4\pi k_z Z)$$

where:
  z = the flat cable depth to which the data is being transformed
  R = reflection coefficient of the water surface
  $k_z = [(\omega/v)^2 - k_x'^2]^{\frac{1}{2}}$.

10. A method of marine seismic exploration, comprising:
  processing seismic data recorded utilizing detectors positioned on a cable towed behind a vessel at substantially a determinable angle so as to substantially remove the time offset in the recorded data resulting from the cable slant for seismic signals arriving at said slanted cable from varying directions, wherein said processing comprises:
  transforming shot gather data from time-offset domain data to horizontal wavenumber-frequency domain data;
  mapping horizontal wave numbers of events in the transformed data to new horizontal wavenumbers so that events appear as if recorded by a horizontal cable, thereby generating remapped data; and
  transforming said remapped data back to the time-offset domain.

11. A method of marine seismic exploration, comprising:
  processing seismic data recorded utilizing detectors positioned on a cable towed behind a vessel at substantially a determinable angle so as to substantially remove the time offset in the recorded data resulting from the cable slant for seismic signals arriving at said slanted cable from varying directions, wherein said processing comprises:

transforming shot gather data from time-offset domain data to horizontal wavenumber-frequency domain data;

mapping horizontal wavenumbers of events in the transformed data to new horizontal wavenumbers so that upwardly traveling events appear as if recorded by a horizontal cable, thereby generating Data Set A;

mapping horizontal wavenumbers of events in the transformed data to new horizontal wavenumbers so that the downwardly traveling events appear as if recorded by a horizontal cable, thereby generating Data Set B;

processing Data Set B so as to make the downwardly traveling events align with upgoing events in Data Set A, thereby generating Data Set C;

summing data sets A and C;

inverse transforming the summation of data sets A and C from the horizontal wavenumber-frequency domain to the time-offset domain.

12. A method of marine seismic exploration, comprising:

processing seismic data recorded utilizing detectors positioned on a cable towed behind a vessel at substantially a determinable angle so as to substantially remove the time offset in the recorded data resulting from the cable slant for seismic signals arriving at said slanted cable from varying directions, wherein said processing comprises:

transforming shot gather data from time-offset domain to horizontal wavenumber-frequency domain data.

mapping horizontal wavenumbers of events in the transformed data to new horizontal wavenumbers so that upwardly traveling events appear as if recorded by a horizontal cable, thereby generating Data Set A;

mapping horizontal wavenumbers of events in the transformed data to new horizontal wavenumbers so that downwardly traveling events appear as if recorded by a horizontal cable, thereby generating Data Set B;

processing Data Set B so as to make the downwardly traveling events align with upgoing events in Data Set A, thereby generating Data Set C;

inverse transforming Data Sets A and C separately from the horizontal wavenumber-frequency domain to the time-offset domain; and summing Data Sets A and C.

13. The method of claim 11 wherein said upwardly traveling events are made to appear as if recorded by a horizontal cable by mapping horizontal wavenumbers to new horizontal wavenumbers utilizing the relation:

$$k_x' = k_x - \alpha[(\omega/v)^2 - k_x^2]^{\frac{1}{2}}$$

where:
$k_x'$ = new horizontal wave number
$k_x$ = horizontal wave number
v = speed of sound in the water
$\alpha$ = angle of cable slant with reference to the horizontal
$\omega$ = angular frequency.

14. The method of claim 12 wherein said upwardly traveling events are made to appear as if recorded by a horizontal cable by mapping horizontal wavenumbers to new horizontal wavenumbers utilizing the relation:

$$k_x' = k_x - \alpha[(\omega/v)^2 - k_x^2]^{\frac{1}{2}}$$

where:
$k_x'$ = new horizontal wave number
$k_x$ = horizontal wave number
v = speed of sound in the water
$\alpha$ = angle of cable slant with reference to the horizontal
$\omega$ = angular frequency.

15. The method of claim 13 wherein said downwardly traveling events are made to appear as if recorded by a horizontal cable by mapping horizontal wavenumbers to new horizontal wavenumbers utilizing the relation $$k_x' = k_x + \alpha[(\omega/v)^2 - k_x^2]^{\frac{1}{2}}$$

where:
$k_x'$ = new horizontal wavenumber
$k_x$ = horizontal wavenumber
v = speed of sound in water
$\alpha$ = angle of cable slant with reference to to the horizontal
$\omega$ = angular frequency.

16. The method of claim 14 wherein said downwardly traveling events are made to appear as if recorded by a horizontal cable by mapping horizontal wavenumbers to new horizontal wavenumbers utilizing the relation $$k_x' = k_x + \alpha[(\omega/v)^2 - k_x^2]^{\frac{1}{2}}$$

where:
$k_x'$ = new horizontal wavenumber
$k_x$ = horizontal wavenumber
v = speed of sound in water
$\alpha$ = angle of cable slant with reference to to the horizontal
$\omega$ = angular frequency.

17. The method of claim 15 wherein said Data Set B is processed so as to make the downwardly traveling events align with upgoing events by multiplying by the factor:

$$(1/R)\exp(i4\pi k_z Z)$$

where:
Z = the flat cable depth to which the data the data is being transformed
R = reflection coefficient of the water surface
$k_z = [(\omega/v)^2 - k_x'^2]^{\frac{1}{2}}$.

18. The method of claim 16 wherein said Data Set B is processed so as to make the downwardly traveling events align with upgoing events by multiplying by the factor:

$$(1/R)\exp(i4\pi k_z Z)$$

where:
z = the flat cable depth to which the data is being transformed
R = reflection coefficient of the water surface
$k_z = [(\omega/v)^2 - k_x'^2]^{\frac{1}{2}}$.

* * * * *